United States Patent
Rekow et al.

(10) Patent No.: US 11,906,670 B2
(45) Date of Patent: *Feb. 20, 2024

(54) INTERFERENCE MITIGATION FOR LIGHT DETECTION AND RANGING

(71) Applicant: VELODYNE LIDAR USA, INC., San Jose, CA (US)

(72) Inventors: Matthew Rekow, Alameda, CA (US); Stephen Nestinger, Fremont, CA (US); Aaron Chen, Fremont, CA (US)

(73) Assignee: Velodyne Lidar USA, Inc., San Jose, CA (US)

( * ) Notice: Subject to any disclaimer, the term of this patent is extended or adjusted under 35 U.S.C. 154(b) by 408 days.

This patent is subject to a terminal disclaimer.

(21) Appl. No.: 16/841,506

(22) Filed: Apr. 6, 2020

(65) Prior Publication Data

US 2021/0003681 A1    Jan. 7, 2021

Related U.S. Application Data

(63) Continuation of application No. 16/459,557, filed on Jul. 1, 2019, now Pat. No. 10,613,203.

(51) Int. Cl.
 *G01S 7/48* (2006.01)
 *G01S 7/487* (2006.01)
 *G01S 17/10* (2020.01)

(52) U.S. Cl.
 CPC .......... *G01S 7/4876* (2013.01); *G01S 17/10* (2013.01)

(58) Field of Classification Search
 USPC ............................................. 356/4.01, 5.01
 See application file for complete search history.

(56) References Cited

U.S. PATENT DOCUMENTS

| 3,064,252 A | 11/1962 | Varela |
| 3,373,441 A | 3/1968 | Zadig |
| 3,551,845 A | 12/1970 | Zelina |
| 3,636,250 A | 1/1972 | Haeff |

(Continued)

FOREIGN PATENT DOCUMENTS

WO    2018129408 A1    7/2012

OTHER PUBLICATIONS

U.S. Appl. No. 15/941,302, filed Mar. 30, 2018.

(Continued)

*Primary Examiner* — James R Hulka
(74) *Attorney, Agent, or Firm* — Kilpatrick Townsend & Stockton LLP

(57) ABSTRACT

Methods, apparatus, and systems related to light detection and ranging (LIDAR) are described. In one example aspect, a LIDAR apparatus includes a light emitter configured to generate, according to a first electrical pulse signal, a pulse light signal. The first electrical pulse signal comprises a first set of non-uniformly spaced pulses. The apparatus includes a receiver configured to convert returned light signals from the object into electrical signals and a filtering subsystem in communication with the receiver, configured to receive the electrical signals from the receiver and remove a point from a set of points representing at least a partial surface of the object as noise by determining whether there is a coherence between the point and corresponding neighboring points of the point along at least a first direction and a second direction of the set of points.

28 Claims, 10 Drawing Sheets

(56) References Cited

U.S. PATENT DOCUMENTS

| | | |
|---|---|---|
| 3,686,514 A | 8/1972 | Dube et al. |
| 3,781,111 A | 12/1973 | Fletcher et al. |
| 3,862,415 A | 1/1975 | Harnden, Jr. et al. |
| 3,897,150 A | 7/1975 | Bridges et al. |
| 4,179,216 A | 12/1979 | Theurer et al. |
| 4,199,697 A | 4/1980 | Edwards |
| 4,201,442 A | 5/1980 | McMahon et al. |
| 4,212,534 A | 7/1980 | Bodlaj |
| 4,220,103 A | 9/1980 | Kasahara et al. |
| 4,477,184 A | 10/1984 | Endo |
| 4,516,837 A | 5/1985 | Soref et al. |
| 4,634,272 A | 1/1987 | Endo |
| 4,656,462 A | 4/1987 | Araki et al. |
| 4,681,433 A | 7/1987 | Aeschlimann |
| 4,700,301 A | 10/1987 | Dyke |
| 4,742,337 A | 5/1988 | Haag |
| 4,834,531 A | 5/1989 | Ward |
| 4,862,257 A | 8/1989 | Ulich |
| 4,895,440 A | 1/1990 | Cain et al. |
| 4,896,343 A | 1/1990 | Saunders |
| 4,902,126 A | 2/1990 | Koechner |
| 4,944,036 A | 7/1990 | Hyatt |
| 4,952,911 A | 8/1990 | D'Ambrosia et al. |
| 4,967,183 A | 10/1990 | D'Ambrosia et al. |
| 5,004,916 A | 4/1991 | Collins, Jr. |
| 5,006,721 A | 4/1991 | Cameron et al. |
| 5,023,888 A | 6/1991 | Bayston |
| 5,026,156 A | 6/1991 | Bayston et al. |
| 5,059,008 A | 10/1991 | Flood et al. |
| 5,175,694 A | 12/1992 | Amato |
| 5,177,768 A | 1/1993 | Crespo et al. |
| 5,210,586 A | 5/1993 | Grage et al. |
| 5,212,533 A | 5/1993 | Shibuya et al. |
| 5,241,481 A | 8/1993 | Olsen |
| 5,249,157 A | 9/1993 | Taylor |
| 5,291,261 A | 3/1994 | Dahl et al. |
| 5,309,212 A | 5/1994 | Clark |
| 5,314,037 A | 5/1994 | Shaw et al. |
| 5,319,201 A | 6/1994 | Lee |
| 5,365,218 A | 11/1994 | Otto |
| 5,463,384 A | 10/1995 | Juds |
| 5,465,142 A | 11/1995 | Krumes et al. |
| 5,515,156 A | 5/1996 | Yoshida et al. |
| 5,546,188 A | 8/1996 | Wangler et al. |
| 5,563,706 A | 10/1996 | Shibuya et al. |
| 5,572,219 A | 11/1996 | Silverstein et al. |
| 5,691,687 A | 11/1997 | Kumagai et al. |
| 5,710,417 A | 1/1998 | Joseph et al. |
| 5,757,472 A | 5/1998 | Wangler et al. |
| 5,757,501 A | 5/1998 | Hipp |
| 5,757,677 A | 5/1998 | Lennen |
| 5,789,739 A | 8/1998 | Schwarz |
| 5,793,163 A | 8/1998 | Okuda |
| 5,793,491 A | 8/1998 | Wangler et al. |
| 5,805,468 A | 9/1998 | Blohbaum |
| 5,847,817 A | 12/1998 | Zediker et al. |
| 5,877,688 A | 3/1999 | Morinaka et al. |
| 5,889,479 A | 3/1999 | Tabel |
| 5,895,984 A | 4/1999 | Renz |
| 5,903,355 A | 5/1999 | Schwarz |
| 5,903,386 A | 5/1999 | Mantravadi et al. |
| 5,923,910 A | 7/1999 | Nakahara et al. |
| 5,942,688 A | 8/1999 | Kimura et al. |
| 5,949,530 A | 9/1999 | Wetteborn |
| 5,953,110 A | 9/1999 | Burns |
| 5,991,011 A | 11/1999 | Damm |
| 6,034,803 A | 3/2000 | Sullivan et al. |
| 6,043,868 A | 3/2000 | Dunne |
| 6,069,565 A | 5/2000 | Stern et al. |
| 6,088,085 A | 7/2000 | Wetteborn |
| 6,100,539 A | 8/2000 | Blumcke et al. |
| 6,137,566 A | 10/2000 | Leonard et al. |
| 6,153,878 A | 11/2000 | Jakob et al. |
| 6,157,294 A | 12/2000 | Urai et al. |
| 6,201,236 B1 | 3/2001 | Juds |
| 6,259,714 B1 | 7/2001 | Kinbara |
| 6,297,844 B1 | 10/2001 | Schatz et al. |
| 6,321,172 B1 | 11/2001 | Jakob et al. |
| 6,327,806 B1 | 12/2001 | Paige |
| 6,329,800 B1 | 12/2001 | May |
| 6,335,789 B1 | 1/2002 | Kikuchi |
| 6,365,429 B1 | 4/2002 | Kneissl et al. |
| 6,396,577 B1 | 5/2002 | Ramstack |
| 6,420,698 B1 | 7/2002 | Dimsdale |
| 6,441,363 B1 | 8/2002 | Cook, Jr. et al. |
| 6,441,889 B1 | 8/2002 | Patterson |
| 6,442,476 B1 | 8/2002 | Poropat |
| 6,473,079 B1 | 10/2002 | Kacyra et al. |
| 6,504,712 B2 | 1/2003 | Hashimoto et al. |
| 6,509,958 B2 | 1/2003 | Pierenkemper |
| 6,593,582 B2 | 7/2003 | Lee et al. |
| 6,621,764 B1 | 9/2003 | Smith |
| 6,636,300 B2 | 10/2003 | Doemens et al. |
| 6,646,725 B1 | 11/2003 | Eichinger et al. |
| 6,650,402 B2 | 11/2003 | Sullivan et al. |
| 6,664,529 B2 | 12/2003 | Pack et al. |
| 6,665,063 B2 | 12/2003 | Jamieson et al. |
| 6,670,905 B1 | 12/2003 | Orr |
| 6,682,478 B2 | 1/2004 | Nakamura |
| 6,710,324 B2 | 3/2004 | Hipp |
| 6,742,707 B1 | 6/2004 | Tsikos et al. |
| 6,747,747 B2 | 6/2004 | Hipp |
| 6,759,649 B2 | 7/2004 | Hipp |
| 6,789,527 B2 | 9/2004 | Sauler et al. |
| 6,798,527 B2 | 9/2004 | Fukumoto et al. |
| 6,812,450 B2 | 11/2004 | Hipp |
| 6,876,790 B2 | 4/2005 | Lee |
| 6,879,419 B2 | 4/2005 | Richman et al. |
| 6,969,558 B2 | 11/2005 | Walston et al. |
| 7,030,968 B2 | 4/2006 | D'Aligny et al. |
| 7,041,962 B2 | 5/2006 | Dollmann et al. |
| 7,089,114 B1 | 8/2006 | Huang |
| 7,106,424 B2 | 9/2006 | Meneely et al. |
| 7,129,971 B2 | 10/2006 | McCutchen |
| 7,130,672 B2 | 10/2006 | Pewzner et al. |
| 7,131,586 B2 | 11/2006 | Tsikos et al. |
| 7,190,465 B2 | 3/2007 | Froehlich et al. |
| 7,240,314 B1 | 7/2007 | Leung |
| 7,248,342 B1 | 7/2007 | Degnan |
| 7,281,891 B2 | 10/2007 | Smith et al. |
| 7,295,298 B2 | 11/2007 | Willhoeft et al. |
| 7,313,424 B2 | 12/2007 | Mayevsky et al. |
| 7,315,377 B2 | 1/2008 | Holland et al. |
| 7,319,777 B2 | 1/2008 | Morcom |
| 7,345,271 B2 | 3/2008 | Boehlau et al. |
| 7,358,819 B2 | 4/2008 | Rollins |
| 7,373,473 B2 | 5/2008 | Bukowski et al. |
| 7,408,462 B2 | 8/2008 | Pirkl et al. |
| 7,480,031 B2 | 1/2009 | Mack |
| 7,544,945 B2 | 6/2009 | Tan et al. |
| 7,570,793 B2 | 8/2009 | Lages et al. |
| 7,583,364 B1 | 9/2009 | Mayor et al. |
| 7,589,826 B2 | 9/2009 | Mack et al. |
| 7,619,477 B2 | 11/2009 | Segarra |
| 7,623,222 B2 | 11/2009 | Benz et al. |
| 7,640,068 B2 | 12/2009 | Johnson et al. |
| 7,642,946 B2 | 1/2010 | Wong et al. |
| 7,684,590 B2 | 3/2010 | Kampchen et al. |
| 7,697,581 B2 | 4/2010 | Walsh et al. |
| 7,741,618 B2 | 6/2010 | Lee et al. |
| 7,746,271 B2 | 6/2010 | Furstenberg |
| 7,868,665 B2 | 1/2011 | Tumer et al. |
| 7,969,558 B2 | 6/2011 | Hall |
| 8,042,056 B2 | 10/2011 | Wheeler et al. |
| 8,077,047 B2 | 12/2011 | Humble et al. |
| 8,139,685 B2 | 3/2012 | Simic et al. |
| 8,203,702 B1 | 6/2012 | Kane et al. |
| 8,274,037 B2 | 9/2012 | Ritter et al. |
| 8,310,653 B2 | 11/2012 | Ogawa et al. |
| 8,605,262 B2 | 12/2013 | Campbell et al. |
| 8,675,181 B2 | 3/2014 | Hall |
| 8,736,818 B2 | 5/2014 | Weimer et al. |
| 8,767,190 B2 | 7/2014 | Hall |
| 8,976,340 B2 | 3/2015 | Gilliland et al. |

(56) References Cited

U.S. PATENT DOCUMENTS

| | | |
|---|---|---|
| 8,995,478 B1 | 3/2015 | Kobtsev et al. |
| 9,063,549 B1 | 6/2015 | Pennecot et al. |
| 9,069,061 B1 | 6/2015 | Harwit |
| 9,069,080 B2 | 6/2015 | Stettner et al. |
| 9,086,273 B1 | 7/2015 | Gruver et al. |
| 9,093,969 B2 | 7/2015 | Gebeyehu et al. |
| 9,110,154 B1 | 8/2015 | Bates et al. |
| 9,151,940 B2 | 10/2015 | Chuang et al. |
| 9,194,701 B2 | 11/2015 | Bosch |
| RE45,854 E | 1/2016 | Gittinger et al. |
| 9,239,959 B1 | 1/2016 | Evans et al. |
| 9,246,041 B1 | 1/2016 | Clausen et al. |
| 9,285,477 B1 | 3/2016 | Smith et al. |
| 9,286,538 B1 | 3/2016 | Chen et al. |
| 9,310,197 B2 | 4/2016 | Gogolla et al. |
| 9,383,753 B1 | 7/2016 | Templeton et al. |
| 9,453,914 B2 | 9/2016 | Stettner et al. |
| 9,529,079 B1 | 12/2016 | Droz et al. |
| 9,772,607 B2 | 9/2017 | Decoux et al. |
| RE46,672 E | 1/2018 | Hall |
| 9,964,632 B1 | 5/2018 | Droz et al. |
| 9,983,297 B2 | 5/2018 | Hall et al. |
| 9,989,629 B1 | 6/2018 | LaChapelle |
| 10,003,168 B1 | 6/2018 | Villeneuve |
| 10,018,726 B2 | 7/2018 | Hall et al. |
| 10,048,374 B2 | 8/2018 | Hall et al. |
| 10,094,925 B1 | 10/2018 | LaChapelle |
| 10,109,183 B1 | 10/2018 | Franz et al. |
| 10,120,079 B2 | 11/2018 | Pennecot et al. |
| 10,126,412 B2 | 11/2018 | Eldada et al. |
| 10,132,928 B2 | 11/2018 | Eldada et al. |
| 10,309,213 B2 | 6/2019 | Barfoot et al. |
| 10,330,780 B2 | 6/2019 | Hall et al. |
| 10,386,465 B2 | 8/2019 | Hall et al. |
| 10,393,877 B2 | 8/2019 | Hall et al. |
| 10,436,904 B2 | 10/2019 | Moss et al. |
| 10,545,222 B2 | 1/2020 | Hall et al. |
| RE47,942 E | 4/2020 | Hall |
| 10,613,203 B1 | 4/2020 | Rekow et al. |
| 10,627,490 B2 | 4/2020 | Hall et al. |
| 10,627,491 B2 | 4/2020 | Hall et al. |
| 2001/0011289 A1 | 8/2001 | Davis et al. |
| 2001/0017718 A1 | 8/2001 | Ikeda et al. |
| 2002/0003617 A1 | 1/2002 | Doemens et al. |
| 2002/0060784 A1 | 5/2002 | Pack et al. |
| 2002/0117545 A1 | 8/2002 | Tsikos et al. |
| 2003/0041079 A1 | 2/2003 | Bellemore et al. |
| 2003/0043363 A1 | 3/2003 | Jamieson et al. |
| 2003/0043364 A1 | 3/2003 | Jamieson et al. |
| 2003/0057533 A1 | 3/2003 | Lemmi et al. |
| 2003/0066977 A1 | 4/2003 | Hipp et al. |
| 2003/0076485 A1 | 4/2003 | Ruff et al. |
| 2003/0090646 A1 | 5/2003 | Riegl et al. |
| 2003/0144011 A1* | 7/2003 | Richards .............. G01S 13/42 455/456.5 |
| 2003/0163030 A1 | 8/2003 | Arriaga |
| 2004/0021852 A1 | 2/2004 | DeFlumere |
| 2004/0066500 A1 | 4/2004 | Gokturk et al. |
| 2004/0134879 A1 | 7/2004 | Kochergin et al. |
| 2004/0150810 A1 | 8/2004 | Muenter et al. |
| 2004/0213463 A1 | 10/2004 | Morrison |
| 2004/0240706 A1 | 12/2004 | Wallace et al. |
| 2004/0240710 A1 | 12/2004 | Lages et al. |
| 2004/0247157 A1 | 12/2004 | Lages et al. |
| 2005/0023353 A1 | 2/2005 | Tsikos et al. |
| 2005/0168720 A1 | 8/2005 | Yamashita et al. |
| 2005/0211893 A1 | 9/2005 | Paschalidis |
| 2005/0232466 A1 | 10/2005 | Kampchen et al. |
| 2005/0246065 A1 | 11/2005 | Ricard |
| 2005/0248749 A1 | 11/2005 | Kiehn et al. |
| 2005/0279914 A1 | 12/2005 | Dimsdale et al. |
| 2006/0007350 A1 | 1/2006 | Gao et al. |
| 2006/0089765 A1 | 4/2006 | Pack et al. |
| 2006/0100783 A1 | 5/2006 | Haberer et al. |
| 2006/0115113 A1 | 6/2006 | Lages et al. |
| 2006/0132635 A1 | 6/2006 | Land |
| 2006/0176697 A1 | 8/2006 | Arruda |
| 2006/0186326 A1 | 8/2006 | Ito |
| 2006/0197867 A1 | 9/2006 | Johnson et al. |
| 2006/0231771 A1 | 10/2006 | Lee et al. |
| 2006/0290920 A1 | 12/2006 | Kampchen et al. |
| 2007/0035624 A1 | 2/2007 | Lubard et al. |
| 2007/0071056 A1 | 3/2007 | Chen |
| 2007/0121095 A1 | 5/2007 | Lewis |
| 2007/0181810 A1 | 8/2007 | Tan et al. |
| 2007/0201027 A1 | 8/2007 | Doushkina et al. |
| 2007/0219720 A1 | 9/2007 | Trepagnier et al. |
| 2007/0241955 A1 | 10/2007 | Brosche |
| 2007/0272841 A1 | 11/2007 | Wiklof |
| 2008/0002176 A1 | 1/2008 | Krasutsky |
| 2008/0013896 A1 | 1/2008 | Salzberg et al. |
| 2008/0074640 A1 | 3/2008 | Walsh et al. |
| 2008/0079371 A1 | 4/2008 | Kang et al. |
| 2008/0154495 A1 | 6/2008 | Breed |
| 2008/0170826 A1 | 7/2008 | Schaafsma |
| 2008/0186501 A1 | 8/2008 | Xie |
| 2009/0010644 A1 | 1/2009 | Varshneya et al. |
| 2009/0026503 A1 | 1/2009 | Tsuda |
| 2009/0085901 A1 | 4/2009 | Antony |
| 2009/0122295 A1 | 5/2009 | Eaton |
| 2009/0142053 A1 | 6/2009 | Varshneya et al. |
| 2009/0168045 A1 | 7/2009 | Lin et al. |
| 2009/0218475 A1 | 9/2009 | Kawakami et al. |
| 2009/0245788 A1 | 10/2009 | Varshneya et al. |
| 2009/0323737 A1 | 12/2009 | Ensher et al. |
| 2010/0006760 A1 | 1/2010 | Lee et al. |
| 2010/0020306 A1 | 1/2010 | Hall |
| 2010/0045965 A1 | 2/2010 | Meneely |
| 2010/0046953 A1 | 2/2010 | Shaw et al. |
| 2010/0134596 A1 | 6/2010 | Becker |
| 2010/0188722 A1 | 7/2010 | Yamada et al. |
| 2010/0198487 A1 | 8/2010 | Vollmer et al. |
| 2010/0204964 A1 | 8/2010 | Pack et al. |
| 2010/0239139 A1 | 9/2010 | Hunt et al. |
| 2010/0265077 A1 | 10/2010 | Humble et al. |
| 2010/0271615 A1 | 10/2010 | Sebastian et al. |
| 2010/0302247 A1* | 12/2010 | Perez .................. G06V 20/64 382/103 |
| 2010/0302528 A1 | 12/2010 | Hall |
| 2011/0028859 A1 | 2/2011 | Chian |
| 2011/0040482 A1 | 2/2011 | Brimble et al. |
| 2011/0211188 A1 | 9/2011 | Juenemann et al. |
| 2011/0216304 A1 | 9/2011 | Hall |
| 2011/0305250 A1 | 12/2011 | Chann et al. |
| 2012/0038903 A1 | 2/2012 | Weimer et al. |
| 2012/0195597 A1 | 8/2012 | Malaney |
| 2012/0287417 A1 | 11/2012 | Mimeault |
| 2013/0024176 A2 | 1/2013 | Woodford |
| 2013/0050144 A1 | 2/2013 | Reynolds |
| 2013/0050486 A1 | 2/2013 | Omer et al. |
| 2013/0070239 A1 | 3/2013 | Crawford et al. |
| 2013/0094960 A1 | 4/2013 | Bowyer et al. |
| 2013/0151198 A1 | 6/2013 | Brown |
| 2013/0168673 A1 | 7/2013 | Yu et al. |
| 2013/0206967 A1 | 8/2013 | Shpunt et al. |
| 2013/0241761 A1 | 9/2013 | Cooper et al. |
| 2013/0242283 A1 | 9/2013 | Bailey et al. |
| 2013/0258312 A1 | 10/2013 | Lewis |
| 2013/0286404 A1 | 10/2013 | Cenko et al. |
| 2013/0300479 A1 | 11/2013 | Thibault |
| 2013/0314711 A1 | 11/2013 | Cantin et al. |
| 2013/0336375 A1 | 12/2013 | Ranki et al. |
| 2013/0342366 A1 | 12/2013 | Kiefer et al. |
| 2014/0063483 A1 | 3/2014 | Li |
| 2014/0071234 A1 | 3/2014 | Millett |
| 2014/0078519 A1 | 3/2014 | Steffey et al. |
| 2014/0104592 A1 | 4/2014 | Tien et al. |
| 2014/0139639 A1* | 5/2014 | Wagner .............. H04N 13/204 348/46 |
| 2014/0220700 A1* | 8/2014 | Alexander ........ G01N 21/3103 436/164 |
| 2014/0240317 A1 | 8/2014 | Go et al. |
| 2014/0240721 A1 | 8/2014 | Herschbach |
| 2014/0253369 A1 | 9/2014 | Kelley et al. |

(56) References Cited

U.S. PATENT DOCUMENTS

| | | |
|---|---|---|
| 2014/0267848 A1 | 9/2014 | Wu |
| 2014/0274093 A1 | 9/2014 | Abdelmonem |
| 2014/0347650 A1 | 11/2014 | Bosch |
| 2015/0015895 A1 | 1/2015 | Bridges et al. |
| 2015/0035437 A1 | 2/2015 | Panopoulos et al. |
| 2015/0055117 A1 | 2/2015 | Pennecot et al. |
| 2015/0101234 A1 | 4/2015 | Priest et al. |
| 2015/0109290 A1 | 4/2015 | Chang et al. |
| 2015/0116695 A1 | 4/2015 | Bartolome et al. |
| 2015/0131080 A1 | 5/2015 | Retterath et al. |
| 2015/0144806 A1 | 5/2015 | Jin et al. |
| 2015/0185325 A1 | 7/2015 | Park et al. |
| 2015/0202939 A1 | 7/2015 | Stettner et al. |
| 2015/0219765 A1 | 8/2015 | Mead et al. |
| 2015/0226853 A1 | 8/2015 | Seo et al. |
| 2015/0293224 A1 | 10/2015 | Eldada et al. |
| 2015/0293228 A1 | 10/2015 | Retterath et al. |
| 2015/0303216 A1 | 10/2015 | Tamaru |
| 2016/0003946 A1 | 1/2016 | Gilliland et al. |
| 2016/0009410 A1 | 1/2016 | Derenick et al. |
| 2016/0014309 A1 | 1/2016 | Ellison et al. |
| 2016/0021713 A1 | 1/2016 | Reed |
| 2016/0049058 A1 | 2/2016 | Allen et al. |
| 2016/0117431 A1 | 4/2016 | Kim et al. |
| 2016/0161600 A1 | 6/2016 | Eldada et al. |
| 2016/0191173 A1 | 6/2016 | Malaney |
| 2016/0252617 A1 | 9/2016 | Tehrani Niknejad et al. |
| 2016/0259038 A1 | 9/2016 | Retterath et al. |
| 2016/0300484 A1 | 10/2016 | Torbett |
| 2016/0306032 A1 | 10/2016 | Schwarz et al. |
| 2016/0306043 A1* | 10/2016 | Moss ................ G01S 7/4817 |
| 2016/0313445 A1 | 10/2016 | Bailey et al. |
| 2016/0327646 A1 | 11/2016 | Scheim et al. |
| 2016/0363659 A1 | 12/2016 | Mindell et al. |
| 2016/0365846 A1 | 12/2016 | Wyland |
| 2017/0146639 A1 | 5/2017 | Carothers |
| 2017/0146640 A1 | 5/2017 | Hall et al. |
| 2017/0153319 A1 | 6/2017 | Villeneuve et al. |
| 2017/0214861 A1 | 7/2017 | Rachlin et al. |
| 2017/0219695 A1 | 8/2017 | Hall et al. |
| 2017/0220876 A1 | 8/2017 | Gao et al. |
| 2017/0220887 A1* | 8/2017 | Fathi ..................... G06T 17/00 |
| 2017/0242102 A1 | 8/2017 | Dussan et al. |
| 2017/0269198 A1 | 9/2017 | Hall et al. |
| 2017/0269209 A1 | 9/2017 | Hall et al. |
| 2017/0269215 A1 | 9/2017 | Hall et al. |
| 2017/0299721 A1 | 10/2017 | Eichenholz et al. |
| 2017/0301104 A1* | 10/2017 | Qian ........................ G06T 7/70 |
| 2017/0350983 A1 | 12/2017 | Hall et al. |
| 2018/0011196 A1* | 1/2018 | Pennecot ............... G01S 17/87 |
| 2018/0019155 A1 | 1/2018 | Tsang et al. |
| 2018/0058197 A1 | 3/2018 | Barfoot et al. |
| 2018/0059219 A1 | 3/2018 | Irish et al. |
| 2018/0074382 A1 | 3/2018 | Lee et al. |
| 2018/0100924 A1 | 4/2018 | Brinkmeyer |
| 2018/0106902 A1 | 4/2018 | Mase et al. |
| 2018/0168539 A1 | 6/2018 | Singh et al. |
| 2018/0267151 A1 | 9/2018 | Hall et al. |
| 2018/0275249 A1 | 9/2018 | Campbell et al. |
| 2018/0276793 A1* | 9/2018 | Kwon ................. H04N 13/221 |
| 2018/0284227 A1 | 10/2018 | Hall et al. |
| 2018/0284274 A1 | 10/2018 | LaChapelle |
| 2018/0321360 A1 | 11/2018 | Hall et al. |
| 2018/0364098 A1 | 12/2018 | McDaniel et al. |
| 2019/0001442 A1 | 1/2019 | Unrath et al. |
| 2019/0011563 A1 | 1/2019 | Hall et al. |
| 2019/0033459 A1* | 1/2019 | Tisdale ................ G01S 7/4808 |
| 2019/0056497 A1 | 2/2019 | Pacala et al. |
| 2019/0178991 A1 | 6/2019 | Hall et al. |
| 2019/0339365 A1 | 11/2019 | Hall et al. |
| 2019/0361092 A1 | 11/2019 | Hall et al. |
| 2019/0369257 A1 | 12/2019 | Hall et al. |
| 2019/0369258 A1 | 12/2019 | Hall et al. |
| 2020/0064452 A1 | 2/2020 | Avlas et al. |
| 2020/0142070 A1 | 5/2020 | Hall et al. |
| 2020/0144971 A1 | 5/2020 | Pinto et al. |
| 2020/0166613 A1 | 5/2020 | Hall et al. |
| 2020/0191915 A1 | 6/2020 | Hall et al. |

OTHER PUBLICATIONS

U.S. Appl. No. 16/510,680, filed Jul. 12, 2019, Hall et al.
U.S. Appl. No. 16/510,710, filed Jul. 12, 2019, Hall et al.
U.S. Appl. No. 16/510,749, filed Jul. 12, 2019, Hall et al.
U.S. Appl. No. 15/420,384, filed Jan. 31, 2017, Hall et al.
U.S. Appl. No. 16/030,780, filed Jul. 9, 2018, Hall et al.
U.S. Appl. No. 11/777,802, filed Jul. 13, 2007, Hall.
U.S. Appl. No. 13/109,901, filed May 17, 2011, Hall et al.
U.S. Appl. No. 15/180,580, filed Jun. 13, 2016, Hall et al.
U.S. Appl. No. 15/700,543, filed Sep. 11, 2017, Hall et al.
U.S. Appl. No. 15/700,558, filed Sep. 11, 2017, Hall et al.
U.S. Appl. No. 15/700,571, filed Sep. 11, 2017, Hall et al.
U.S. Appl. No. 15/700,836, filed Sep. 11, 2017, Hall et al.
U.S. Appl. No. 15/700,844, filed Sep. 11, 2017, Hall et al.
U.S. Appl. No. 15/700,959, filed Sep. 11, 2017, Hall et al.
U.S. Appl. No. 15/700,965, filed Sep. 11, 2017, Hall et al.
U.S. Appl. No. 16/912,648, filed Jun. 25, 2020, Hall et al.
U.S. Appl. No. 15/926,095, filed Mar. 30, 2018, Hall et al.
U.S. Appl. No. 15/464,227, filed Mar. 30, 2017, Hall et al.
U.S. Appl. No. 15/464,221, filed Mar. 30, 2017, Hall et al.
U.S. Appl. No. 15/974,527, filed May 8, 2018, Hall et al.
U.S. Appl. No. 16/748,498, filed Jan. 21, 2020, Hall et al.
U.S. Appl. No. 15/610,975, filed Jun. 1, 2017, Hall et al.
U.S. Appl. No. 16/546,131, filed Aug. 20, 2019, Hall et al.
U.S. Appl. No. 16/842,491, filed Apr. 7, 2020, Hall et al.
U.S. Appl. No. 16/546,184, filed Aug. 20, 2019, Hall et al.
U.S. Appl. No. 16/546,206, filed Aug. 20, 2019, Hall et al.
U.S. Appl. No. 16/909,306, filed Jun. 23, 2020, Hall et al.
U.S. Appl. No. 15/339,790, filed Oct. 31, 2016, Hall et al.
U.S. Appl. No. 16/854,755, filed Apr. 21, 2020, Hall et al.
U.S. Appl. No. 16/905,843, filed Jun. 18, 2020, Hall et al.
U.S. Appl. No. 16/905,849, filed Jun. 18, 2020, Hall et al.
U.S. Appl. No. 16/909,846, filed Jun. 23, 2020, Hall et al.
U.S. Appl. No. 15/835,983, filed Dec. 8, 2017, Hall et al.
U.S. Appl. No. 16/459,557, filed Jul. 1, 2019, Rekow et al.
U.S. Appl. No. 16/112,273, filed Aug. 24, 2018, Avlas et al.
U.S. Appl. No. 16/181,523, filed Nov. 6, 2018, Pinto et al.
U.S. Appl. No. 16/241,849, filed Jan. 7, 2019, Hall et al.
U.S. Appl. No. 16/241,963, filed Jan. 7, 2019, Hall et al.
*Quanergy Systems, Inc.* v. *Velodyne Lidar, Inc.* (N.D. Cal.), Docket No. 5:16-cv-05251, filed Sep. 13, 2016, U.S. Pat. No. 7,969,558.
*Velodyne Lidar, Inc.* v. *Hesai Photonics Technology Co., Ltd.* (N.D. Cal.), Docket No. 5:16-cv-04742, filed Aug. 13, 2019, U.S. Pat. No. 7,969,558.
*Velodyne Lidar, Inc.* v. *Suteng Innovation Technology Co., Ltd.* (N.D. Cal.), Docket No. 5:16-cv-04746, filed Aug. 13, 2019, U.S. Pat. No. 7,969,558.
*In re Certain Rotating 3-D Lidar Devices, Components Thereof, and Sensing Systems Containing the Same* (ITC), Investigation No. ITC-337-TA-1173, filed Aug. 15, 2019, U.S. Pat. No. 7,969,558.
Petition for Inter Partes Review (USPTO Patent Trial and Appeal Board), Case No. IPR2018-00255, filed Nov. 29, 2017, U.S. Pat. No. 7,969,558.
Petition for Inter Partes Review (USPTO Patent Trial and Appeal Board), Case No. IPR2018-000255, filed Nov. 29, 2017, U.S. Pat. No. 7,969,558.
PCT International Search Report and Written Opinion, App. No. PCT/US2018/059452, dated Jan. 16, 2019, 12 pages.
PCT International Search Report and Written Opinion, App. No. PCT/US2018/025395, dated Jun. 25, 2018, 14 pages.
PCT International Search Report and Written Opinion, App. No. PCT/US2017/015874, dated May 23, 2017, 12 pages.
PCT International Search Report and Written Opinion, App. No. PCT/US2017/015877, dated Apr. 13, 2017, 13 pages.
PCT International Search Report and Written Opinion, App. No. PCT/US2007/073490, (dated 2008), 10 pages.

(56) References Cited

OTHER PUBLICATIONS

PCT International Search Report and Written Opinion, App. No. PCT/US2017/023261, dated May 26, 2017, 11 pages.
PCT International Search Report and Written Opinion, App. No. PCT/US2018/051497, dated Nov. 28, 2018, 11 pages.
PCT International Search Report and Written Opinion, App. No. PCT/US2019/046422, dated Dec. 3, 2019, 9 pages.
PCT International Search Report and Written Opinion, App. No. PCT/US2018/023283, dated Jun. 1, 2018, 9 pages.
PCT International Search Report and Written Opinion, App. No. PCT/US2017/023259, dated May 31, 2017, 10 pages.
PCT International Search Report and Written Opinion, App. No. PCT/US2017/015869, dated Apr. 10, 2017, 12 pages.
PCT International Search Report and Written Opinion, App. No. PCT/US2018/050934, dated Nov. 20, 2018, 10 pages.
PCT International Search Report and Written Opinion, App. No. PCT/US2010/037129, dated Jul. 27, 2010, 6 pages.
PCT International Search Report and Written Opinion, App. No. PCT/US2017/036865, dated Sep. 26, 2017, 10 pages.
PCT International Search Report and Written Opinion, App. No. PCT/US2017/023262, dated Jun. 5, 2017, 9 pages.
PCT International Search Report and Written Opinion, App. No. PCT/US2017/047543, dated Nov. 27, 2017, 11 pages.
PCT International Search Report and Written Opinion, App. No. PCT/US2018/059062, dated Jan. 16, 2019, 6 pages.
PCT International Search Report and Written Opinion, App. No. PCT/US2019/046573, dated Nov. 15, 2019, 9 pages.
PCT International Search Report and Written Opinion, App. No. PCT/US2019/016259, dated Apr. 26, 2019, 6 pages.
PCT International Search Report and Written Opinion, App. No. PCT/US2019/051729, dated Nov. 20, 2019, 7 pages.
PCT Search Report and Written Opinion (Corrected), App. No. PCT/US2020/026925, dated May 12, 2020, 5 pages.
PCT Search Report and Written Opinion, App. No. PCT/US2020/012633, dated Jun. 2, 2020, 13 pages.
PCT Search Report and Written Opinion, App. No. PCT/US2020/012635, dated Jun. 4, 2020, 10 pages.
PCT International Search Report and Written Opinion, App. No. PCT/US2018/031682, dated Sep. 17, 2018, 12 pages.
PCT International Search Report and Written Opinion, App. No. PCT/US2017/035427, dated Aug. 29, 2017, 10 pages.
PCT International Search Report and Written Opinion, App. No. PCT/US2019/046412, dated Jun. 24, 2020, 10 pages.
PCT International Search Report and Written Opinion, App. No. PCT/US2019/046419, dated Oct. 29, 2019, 14 pages.
EP20834220.4, "Extended European Search Report", dated Sep. 22, 2023, 9 pages.

\* cited by examiner

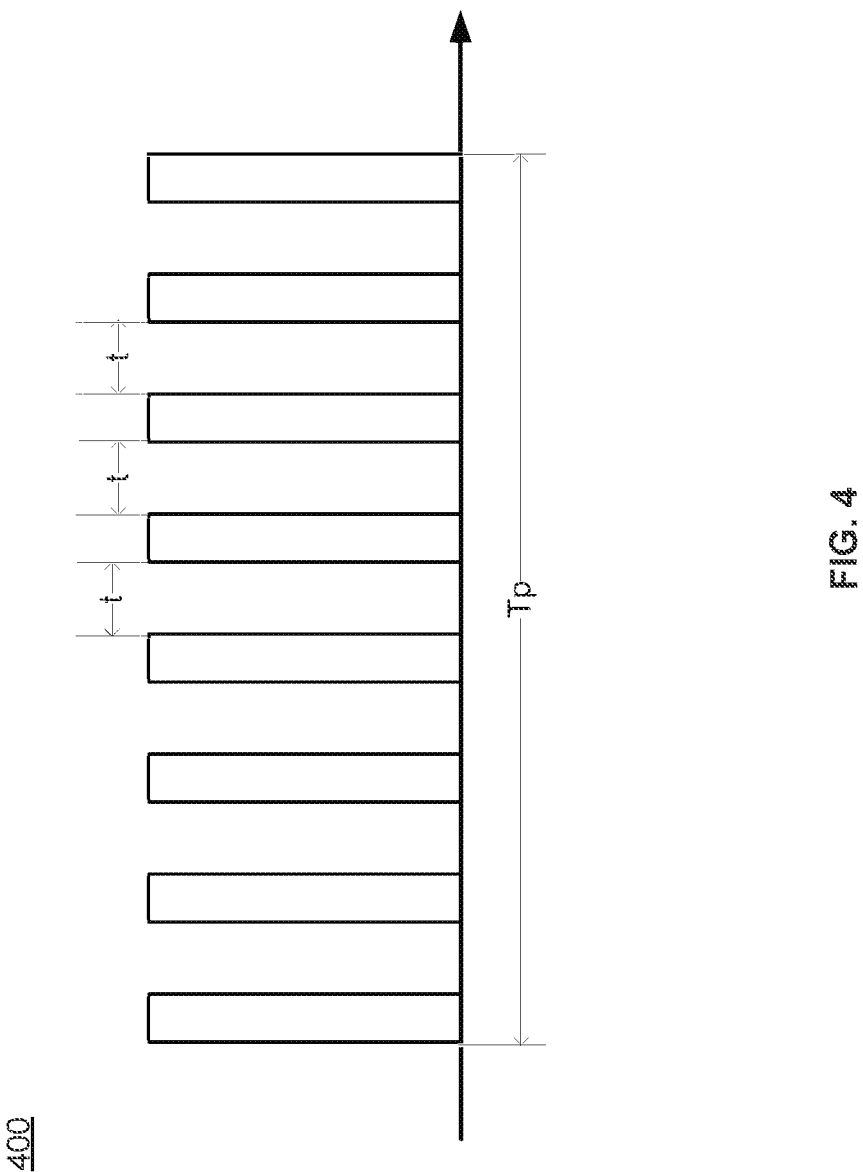

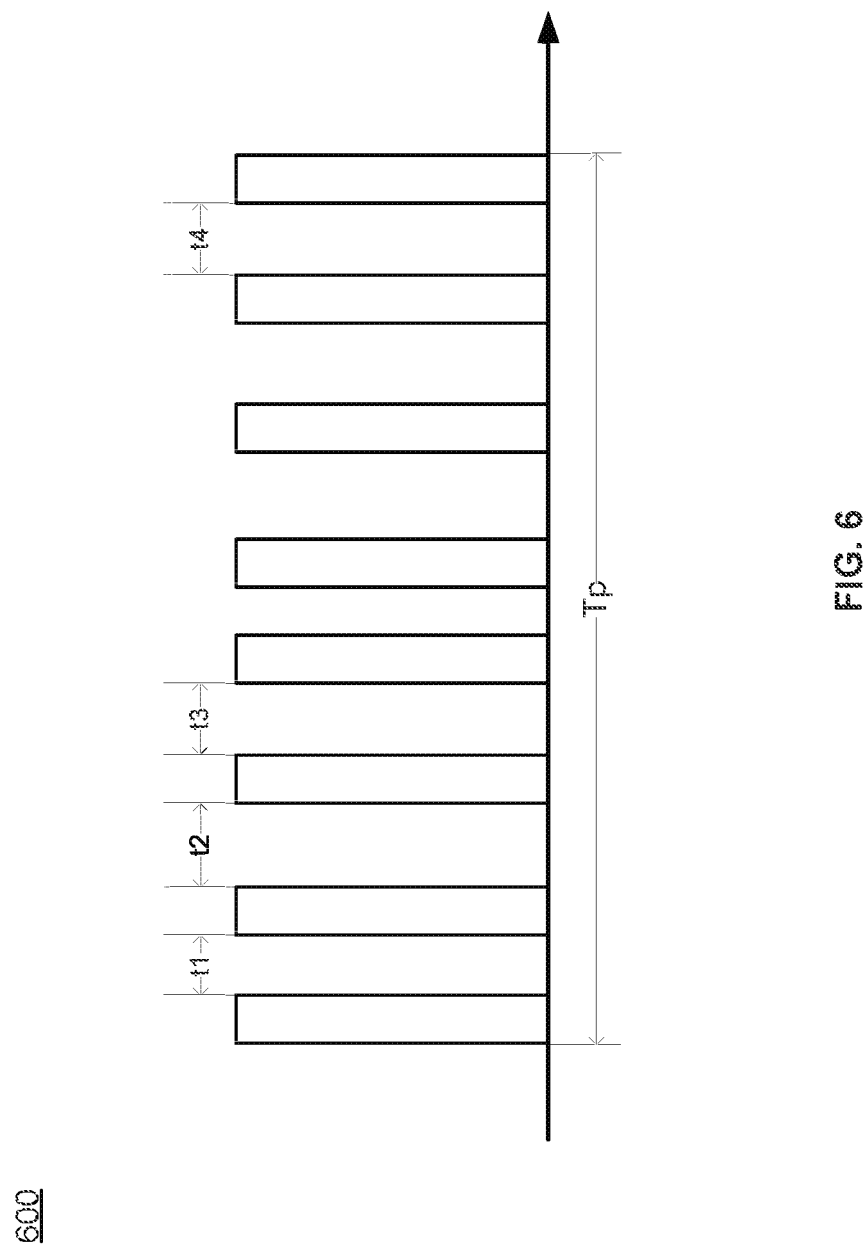

INTERFERENCE MITIGATION FOR LIGHT DETECTION AND RANGING

CROSS REFERENCE TO RELATED APPLICATION

The present application is a continuation of and claims priority to U.S. patent application Ser. No. 16/459,557, entitled "Interference Mitigation For Light Detection And Ranging," filed Jul. 1, 2019.

BACKGROUND

Light Detection and Ranging (LIDAR) is a remote sensing method that uses light in the form of a pulsed laser to measure variable distances to the environment. LIDAR systems have a wide range of applications including autonomous driving and aerial mapping of a surface. These applications may place a high priority on the security, accuracy and reliability of the operation. The disclosed embodiments provide methods and systems to reduce or minimize signal interference when multiple LIDAR sensors are present, thereby generating reliable data for determining surface features of the environment. The additional features and benefits of the disclosed technology, as well as their further applications and implementations, are described in the sections that follow.

BRIEF DESCRIPTION OF THE DRAWINGS

FIG. 4 depicts an example pulse signal generated by a controller.

FIG. 6 illustrates an example dithered pulse signal in accordance with the present technology.

DETAILED DESCRIPTION

LIDAR systems operate by transmitting a series of light pulses that reflect off objects. The reflected signal, or return signal, is received by the light detection and ranging system. Based on the detected time-of-flight (TOF), the system determines the range/distance between the system and the object.

Figure 1:
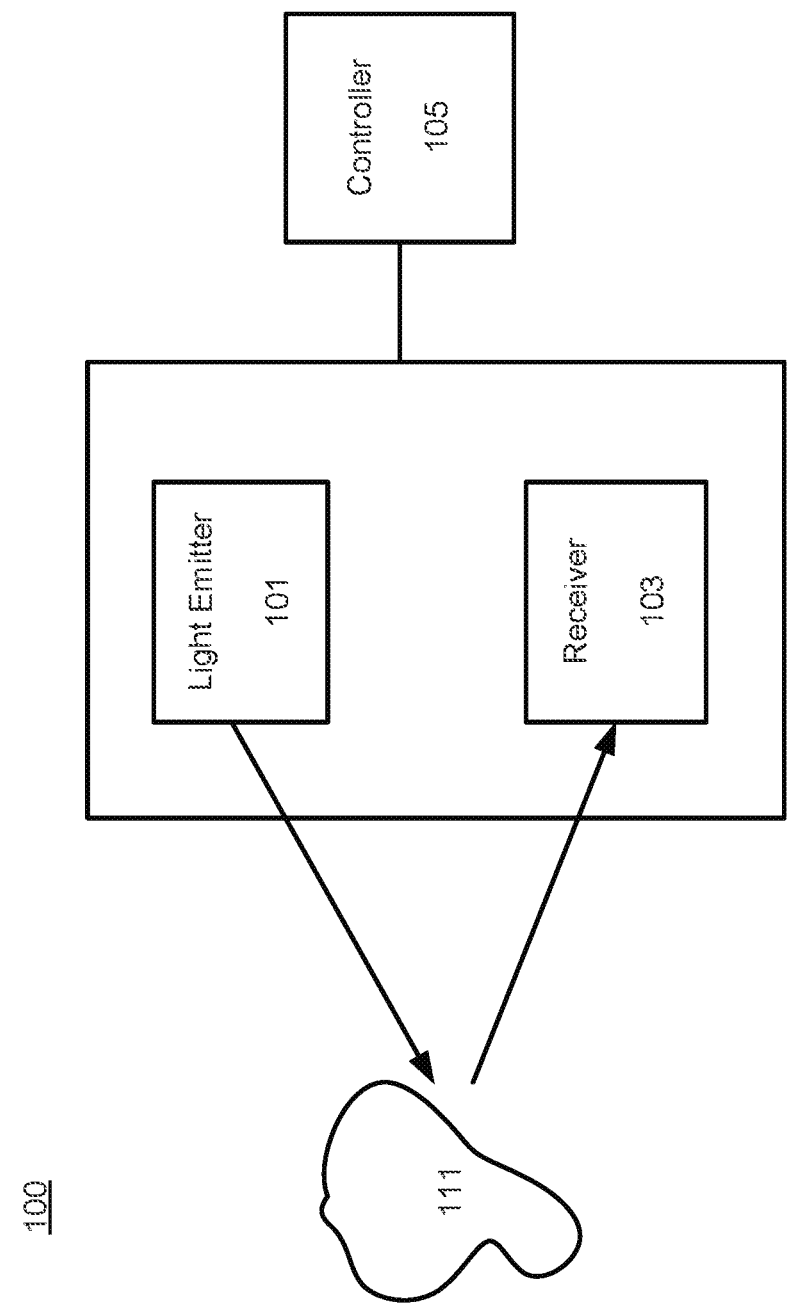
FIG. 1 illustrates an example schematic diagram of a LIDAR sensor in accordance with the present technology.

FIG. 1 illustrates an example schematic diagram of a LIDAR sensor 100 in accordance with the present technology. The LIDAR sensor 100 includes a light emitter 101 that emits a light signal to an object 111 in an external environment and a receiver 103 that receives the return signal reflected by an object 111. In some embodiments, the LIDAR sensor 100 adopts a beam steering mechanism to steer the light signal to the object 111. In some embodiments, the LIDAR sensor 100 can be configured to rotate around an axis to achieve a larger field of view (e.g., a 360-degree horizontal field of view). The receiver 103 may include an analog-to-digital (A2D) convertor (not shown) that converts the return signal to a corresponding electrical signal. In some embodiments, the LIDAR sensor 100 may optionally include a controller 105. In some embodiments, the controller is a part of the LIDAR systems. The controller 105 is in communication with both the light emitter 101 and the receiver 103 so that the controller 105 can control light emissions by the light emitter 101 and process the electrical signals from the receiver 103. In some embodiments, the controller 105 uses a set of points, such as a point cloud, based on the captured distances to represent at least a partial surface the object 111 in the environment. The points in the point cloud can represent or indicate surface features of the object 111.

Figure 2:
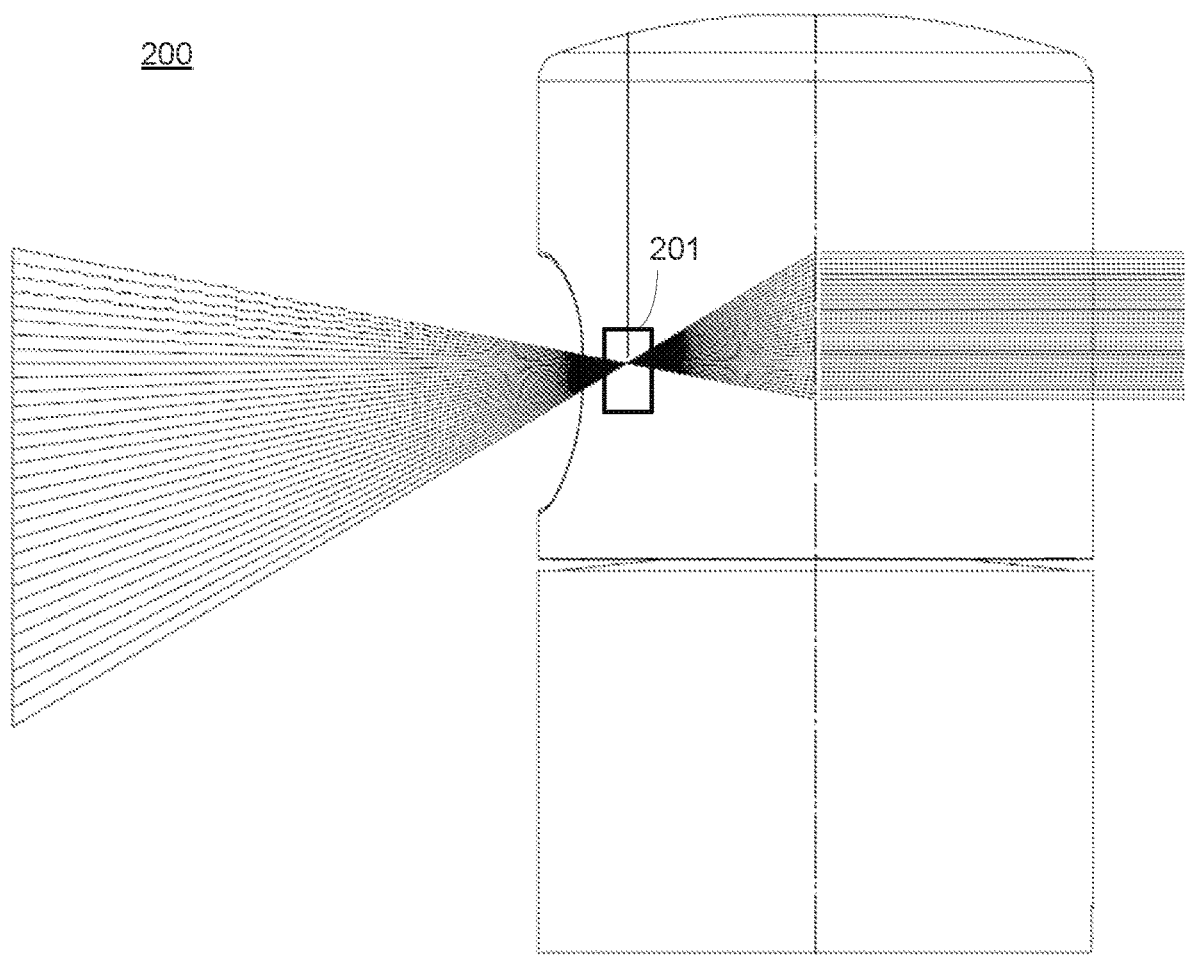
FIG. 2 illustrates an example schematic diagram of a LIDAR system in accordance with the present technology.
Figure 3:
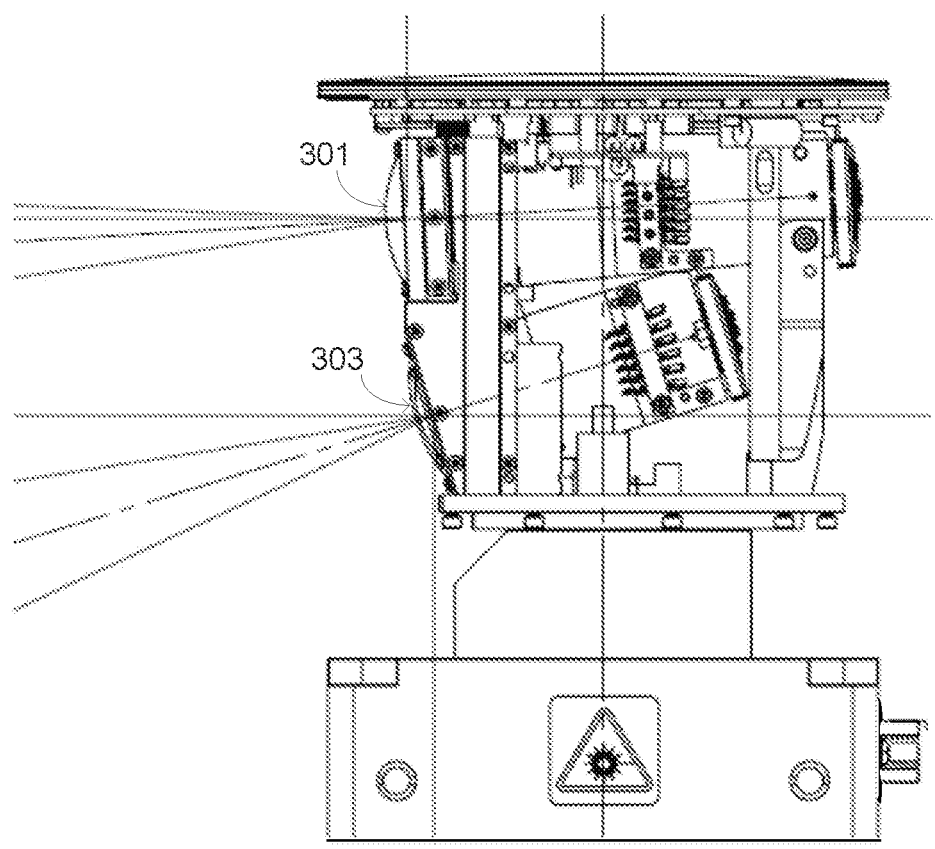
FIG. 3 illustrates another example schematic diagram of a LIDAR system in accordance with the present technology.

In some embodiments, the light emitter 101 can emit multiple light beams. FIG. 2 illustrates an example schematic diagram of a LIDAR system 200 in accordance with the present technology. The LIDAR system 200 includes a LIDAR sensor 201 that emits a plurality of beams over an angular range. In this particular example, the light emitter can emit 32 beams of light (also referred to as 32 channels). In some embodiments, the LIDAR system includes multiple LIDAR sensors to obtain a dense set of data for an accurate representation of the object. FIG. 3 illustrates an example schematic diagram of a LIDAR system 300 in accordance with the present technology. The LIDAR system 300 depicted in this example includes a first LIDAR sensor 301 and a second LIDAR sensor 303. Both of the sensors are capable of emitting multiple light beams. Because the sensors are positioned in proximity to each other within a single LIDAR system, crosstalk interference among the sensors can occur. Furthermore, with an increasing number of autonomous vehicles equipped with LIDAR systems to detect and avoid obstacles in the environment, direct interference among multiple LIDAR sensors may occur. The reception of foreign light signals can lead to problems such as ghost targets or a reduced signal-to-noise ratio. Disclosed herein are techniques that can be implemented in various embodiments to reduce or minimize the impact of interference among multiple LIDAR sensors, thereby providing a more reliable model to represent the environment for safe maneuvering.

Figure 5A:
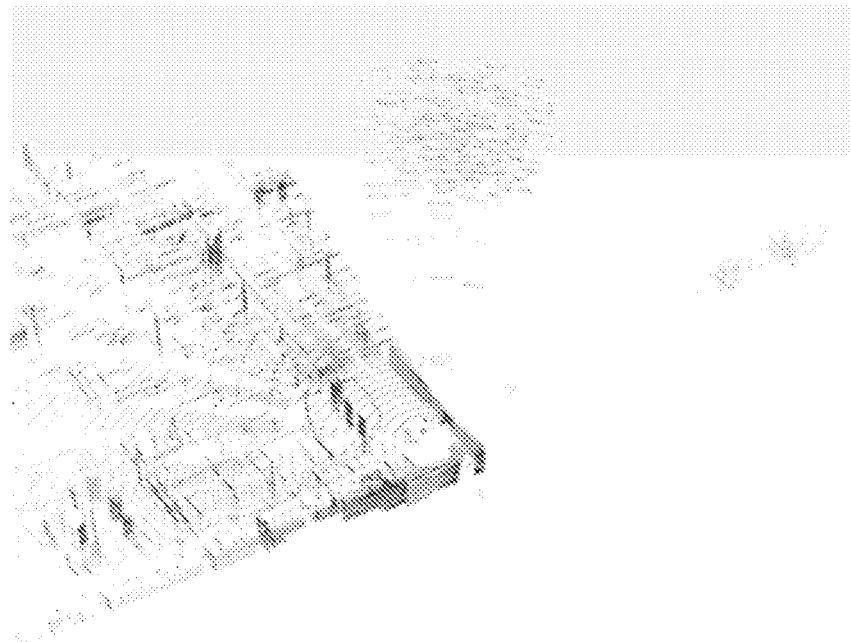
FIG. 5A illustrates an example interference pattern that appears in a point cloud.
Figure 5B:
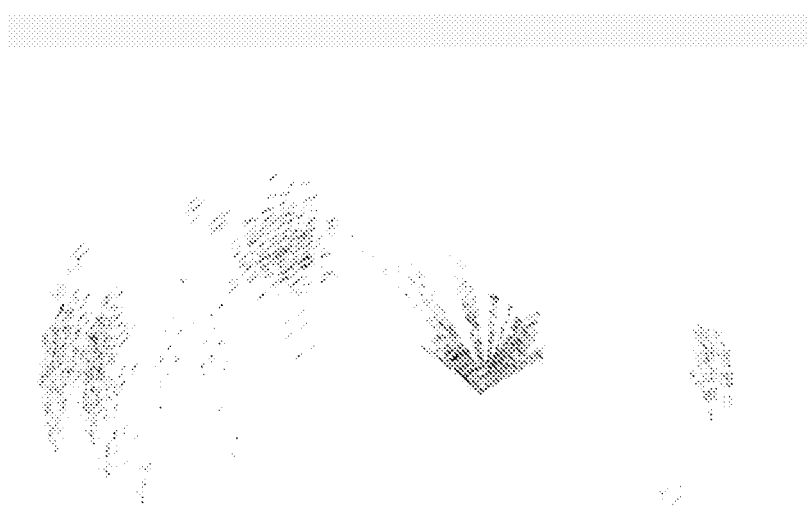
FIG. 5B illustrates an example interference pattern that appears in a point cloud.

In some LIDAR systems, the light emitter generates pulsed light emissions in response to a pulse electrical signal provided by the controller. FIG. 4 depicts an example pulse electrical signal 400 generated by a controller. The pulse signal 400 includes multiple uniformly or non-uniformly spaced pulses. For example, the pulses can be uniformly distributed in a period of time Tp. That is, adjacent pulses are separated by the same distance of t in the time domain. As discussed above, when there are multiple light beams generated according to the same pulse signal, direct or crosstalk interference among the signals is likely to occur. For example, for multi-sensor LIDAR systems, inter-sensor interference can happen, which includes direct interference when sensors are pointing at each other and indirect interference when signals from multiple sensors bounce off the object(s). For single-sensor multi-beam LIDAR systems, intra-sensor interference can happen. Signals from multiple beams can bounce off the object(s) and form an interference pattern. When signals at the same time-domain location interfere, the resulting interference may be transformed into ghost targets that are located at approximately the same distance from the LIDAR sensor. FIGS. 5A-B illustrate example interference patterns that can appear in a point cloud. In these examples, the interference can appear as a curved surface in the point cloud data set. The curve surface can be interpreted as a real obstacle in the environment, thereby severely impacting computations of the controller and subsequent navigation of the vehicle that carries the LIDAR system.

One way to minimize the impact of such interference is to distribute the interference signals across the field of view of the LIDAR sensor. If the interference shows up as small ghost points located at various distances from the LIDAR sensor, there is a lower probability for the controller to interpret these signals as a solid obstacle. Instead of generating pulses that are uniformly spaced in the time domain, the controller can control the light emitter to "dither" the pulse signal so that the firing time of the pulses is randomized in the period $T_p$. FIG. 6 illustrates an example dithered pulse signal in accordance with the present technology. A randomized $\Delta t_{random}$ can be added or subtracted from t for each firing of the pulse. Thus, the adjacent pulses are separated by different distances ($t \pm \Delta t_{random}$) in the time domain. For example, $\Delta t_{random}$ can be generated by a pseudo-random generation algorithm. In some embodiments, $\Delta t_{random}$ is up to around 1 µs. In the specific example shown in FIG. 6, $t_1 = t \pm \Delta t_{random1}$, $= t \pm \Delta t_{random2}$, $t_3 = t \pm \Delta t_{random3}$, and $t_1 \neq t_2 \neq t_3$. Due to the nature of pseudo-random generation, occasionally two adjacent pulses may have the same spacing as compared to two pulses in another sequence. For example, 14 in FIG. 6 can be equal to t in FIG. 4. However, the time-domain spacings of the pulses are sufficiently different due to the randomization so that the interference, when it does occur, is distributed in distance to form a more uniform noise pattern.

In some embodiments, the firing sequence can be dynamically re-ordered to allow a larger range of $\Delta t_{random}$. In some embodiments, the dithering techniques as described herein can be combined with a pulse signal signature, described in U.S. Pub. No. 2019/0178991, the entire content of which is incorporated by reference as part of the disclosure of this patent document to further reduce or minimize the impact of interference. For example, each pulse signal can be given a pulse signal signature. In some embodiments, each pulse signal has a unique signature to ensure the security and reliability of the generated data. In some embodiments, the number of unique signatures available to the LIDAR sensor (also referred to as the code base) may be limited by various factors. Given a small code base, two LIDAR sensors may have the same signature at the same time, leading to an interference pattern such as shown in FIG. 5. Combining the dithering techniques with a code base of unique pulse signatures can greatly reduce the likelihood of signal interference by two LIDAR sensors sharing the same pulse signal.

Figure 7:
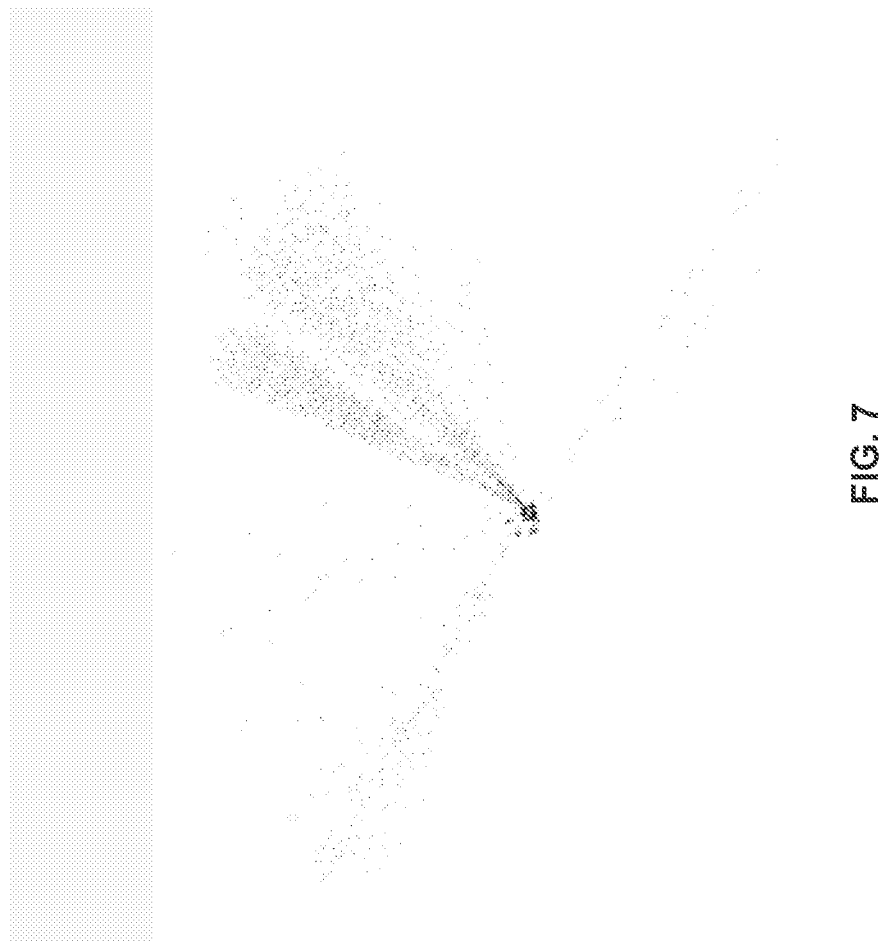
FIG. 7 illustrates an example interference pattern after dithering the pulse signal in accordance with the present technology.

FIG. 7 illustrates an example interference pattern after dithering the pulse signal in accordance with the present technology. As shown in FIG. 7, the interference is more uniformly distributed to resemble a white noise pattern. The controller now can apply a filtering process to remove the points that are deemed as interference.

Figure 8:
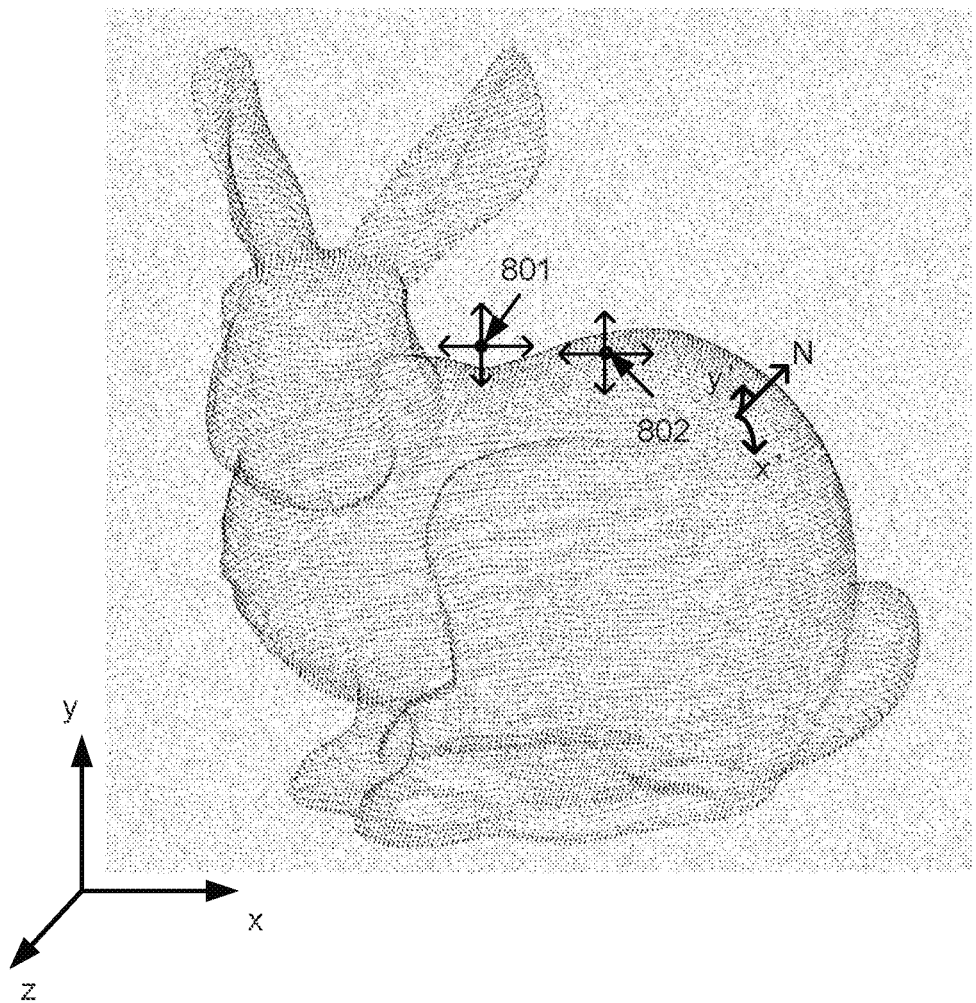
FIG. 8 illustrates an example of a filtering process in accordance with the present technology.

FIG. 8 illustrates an example of a filtering process in accordance with the present technology. In FIG. 8, a set of points has been collected to represent an object or at least a partial surface of the object in the environment. The collected points also include a significant amount of interference showing as noise. In order to determine whether a particular point is interference/noise or actual data representing the object, the controller can check information carried in the neighboring points to determine whether there is a coherency among the points.

In some embodiments, the points in the point cloud dataset are represented using a Cartesian coordinate system. Information carried by the neighboring points in x, y, and/or z directions, such as the location or the color, can be used to determine whether the point and its neighbors represent the same surface. For example, as shown in FIG. 8, point 801 can be checked against its neighboring points in x, y, and/or z directions. The neighboring points along x direction of point 801 do not provide sufficient information because they also appear to be noise. However, the neighboring points along y direction of point 801 indicate that there is no coherence between point 801 and some of the neighbors; they appear to represent two separate surfaces. Point 801 can thus be filtered out as a noise point. Similarly, point 802 can be checked against its neighboring points. The neighboring points along both x and y directions indicate that there exists a coherence between point 802 and its neighbors. Thus, point 802 remains in the model.

In some embodiments, the points in the point cloud carry a normal vector N indicating an estimated surface normal of the object. Based on the normal vector N, two substantially orthogonal directions x' and y' can be determined. Information carried by the neighboring points in x' and y' can be used to determine whether the point and its neighbor represent the same surface. For example, in some embodiments, each point carries color information. If the point has the same color as its neighboring points (or if the color difference is equal to or less to a predefined threshold), a point coherence exists. As another example, if a distance between the point and its neighboring point exceeds a predefined threshold, the controller can determine that there is no coherence between the point and its neighbors. When there is no coherence between a point and its neighbors, the point is removed or filtered from the model as noise.

Examining neighboring points in two or more directions can provide a more reliable determination of the point coherence when the object has a sharp surface feature or a small dimension along one direction. For example, if the object is a thin, long pole, examining points along the x direction in the Cartesian coordinate system may not provide sufficient amount of information because there are only a few surface points available. Examining points along the y direction, however, allows the system to use more surface points of the pole to determine whether a coherence exists between the target point (potentially a noise point) and the object.

In some embodiments, a bounding box is placed around the target point. The spatial neighbors of the target point generated by prior and/or next signals from the same channel or concurrent/prior/next signals from a vertically adjacent channel are examined. If the distance between a neighboring point and the target point is equal to or less than a threshold, the target point can be considered as a coherent point to the neighboring point. Other factors, such as color of the object, reflectivity of the object, strength of the signal, and signal to noise ratio (SNR) of the signal are also considered to determine the coherence. In some implementations, when the number of coherent points in the bounding box exceeds a predetermine threshold (e.g., nine neighboring returns), the target point is considered a valid data point instead of noise/interference.

In some embodiments, to obtain optimal real-time performance, the LIDAR sensor may track a small set of points in the point cloud dataset instead of the entire dataset for the object(s) in the environment. Thus, instead of filtering the entire dataset at once, the LIDAR sensor or a filtering subsystem of the LIDAR sensor performs real-time filtering. The real-time filtering can be performed to one object within a selected few frames, or multiple objects within one frame. The controller or the filtering subsystem can also make certain assumptions about the object (e.g., smoothness, color, location, size) to facilitate real-time filtering of the noise/interference points.

In some implementations, a confidence of validity of the filtering process can be derived based on the number of coherent points in the bounding box. As discussed above, the LIDAR sensors can emit multiple sets of signals concurrently. A combination of the dithering pattern (e.g., the burstiness of multiple channels) and a low confidence of validity in the filtering process can be used together to indicate whether the target point is a result of direct or crosstalk interference.

Figure 9:
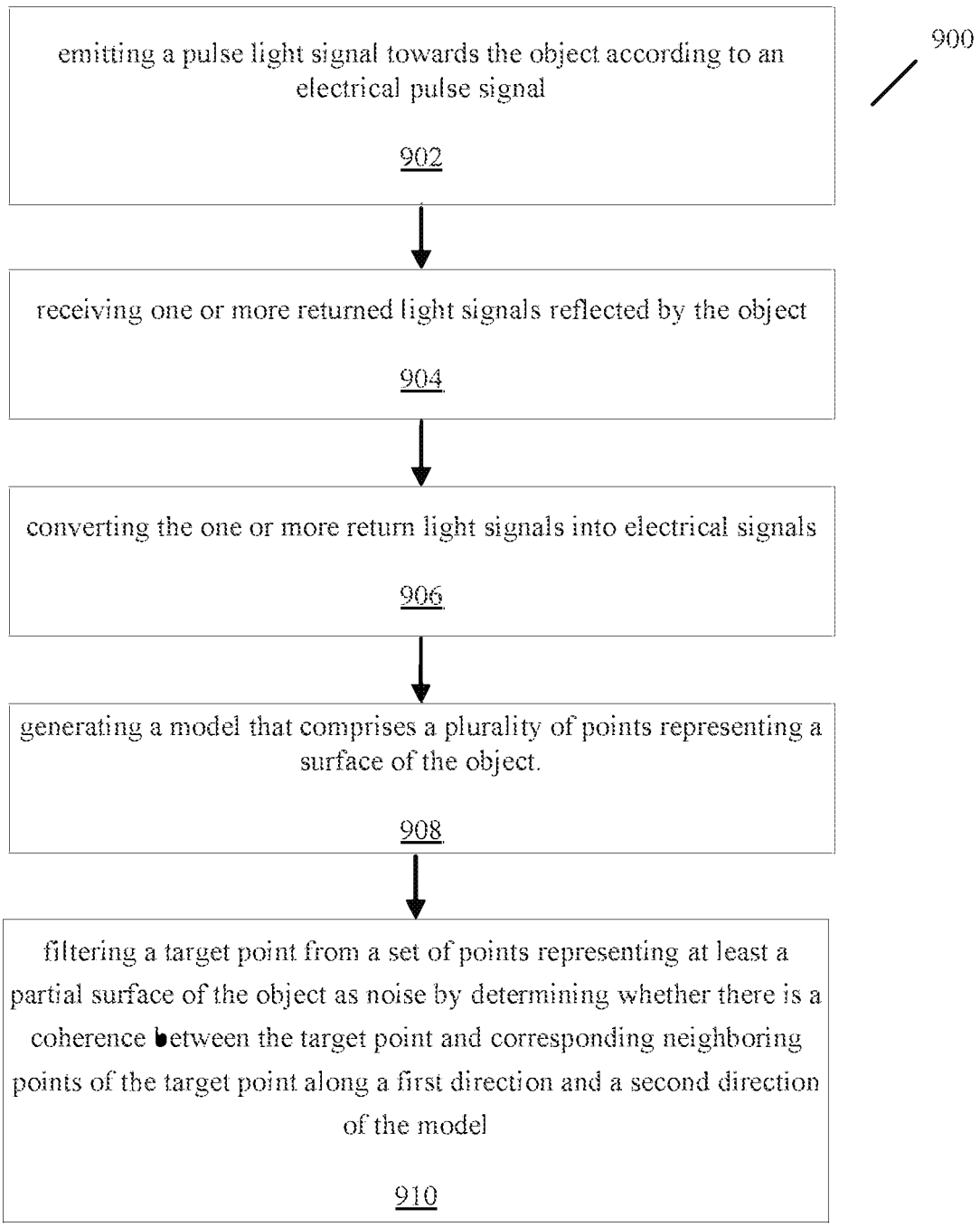
FIG. 9 is a flowchart representation of a method for sensing an object in an external environment using a light detection and ranging device in accordance with the present technology.

FIG. 9 is a flowchart representation of a method 900 for sensing an object in an external environment using a light detection and ranging device in accordance with the present technology. The method 900 includes, at operation 902, emitting, by a light emitter of the light detection and range device, a pulse light signal towards the object according to an electrical pulse signal. The electrical pulse signal comprises a first set of non-uniformly spaced pulses. The method 900 includes, at operation 904, receiving, by a receiver of the light detection and range device, one or more returned light signals reflected by the object. The method 900 includes, at operation 906, converting, by the receiver, the one or more return light signals into electrical signals. The method 900 includes, at operation 908, generating, based on the electrical signals, a model that comprises a plurality of points representing a surface of the object. The method 900 includes, at operation 910, filtering a target point from a set of points representing at least a partial surface of the object as noise by determining whether there is a coherence between the target point and corresponding neighboring points of the target point along a first direction and a second direction of the model.

Figure 10:
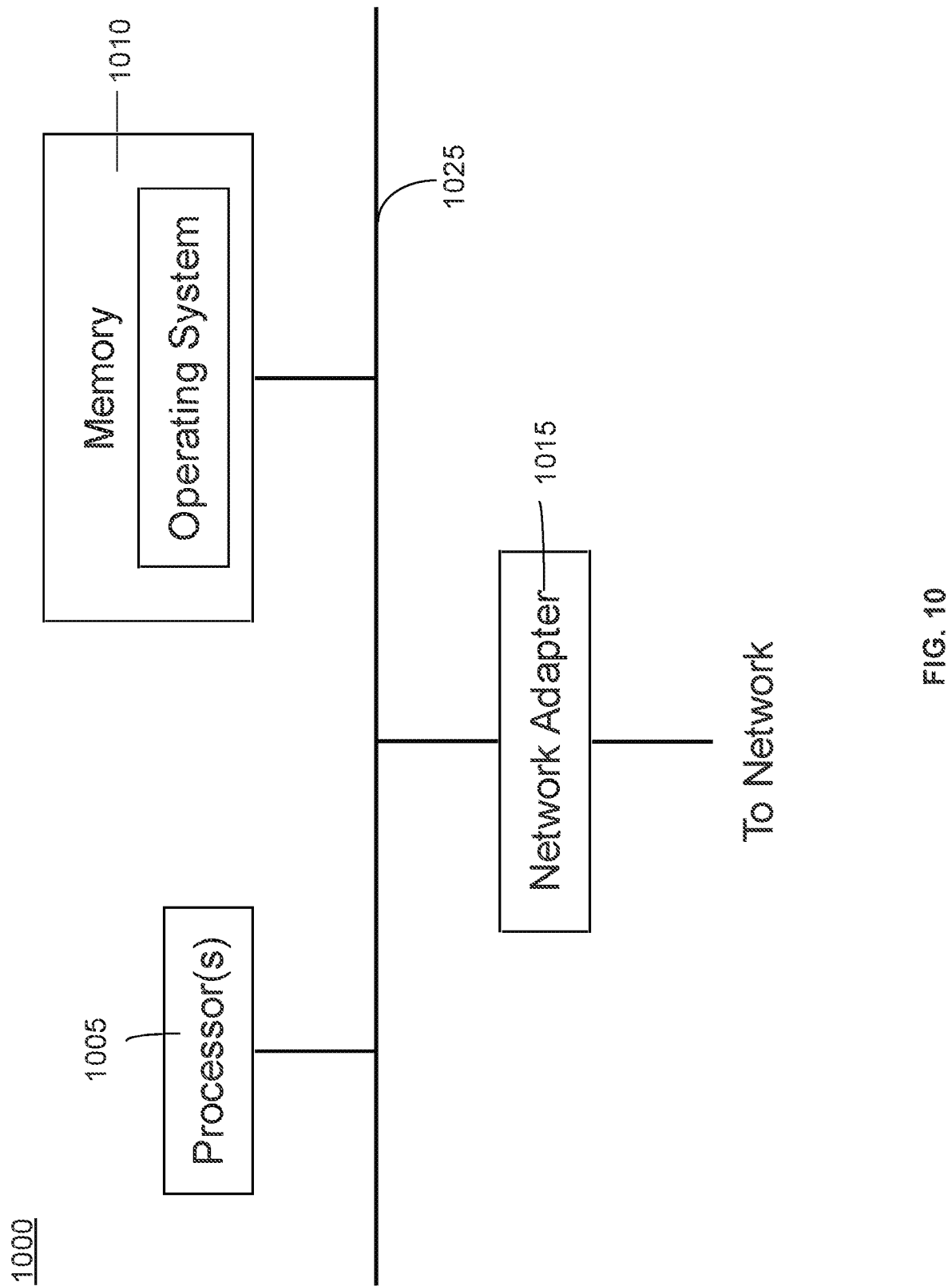
FIG. 10 is a block diagram illustrating an example of the architecture for a computer system or other control device that can be utilized to implement various portions of the presently disclosed technology.

FIG. 10 is a block diagram illustrating an example of the architecture for a computer system or other control device 1000 that can be utilized to implement various portions of the presently disclosed technology, such as the controller 105 shown in FIG. 1. In FIG. 10, the computer system 1000 includes one or more processors 1005 and memory 1010 connected via an interconnect 1025. The interconnect 1025 may represent any one or more separate physical buses, point to point connections, or both, connected by appropriate bridges, adapters, or controllers. The interconnect 1025, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 1005 may include central processing units (CPUs) to control the overall operation of, for example, the host computer. In certain embodiments, the processor(s) 1005 accomplish this by executing software or firmware stored in memory 1010. The processor(s) 1005 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 1010 can be, or include, the main memory of the computer system. The memory 1010 represents any suitable form of random-access memory (RAM), read-only memory (ROM), flash memory, or the like, or a combination of such devices. In use, the memory 1010 may contain, among other things, a set of machine instructions which, when executed by processor 1005, causes processor 1005 to perform operations to implement embodiments of the presently disclosed technology.

Also connected to the processor(s) 1005 through the interconnect 1025 is a (optional) network adapter 1015. The network adapter 1015 provides the computer system 1000 with the ability to communicate with remote devices, such as the storage clients, and/or other storage servers, and may be, for example, an Ethernet adapter or Fiber Channel adapter.

It is thus evident that the disclosed techniques can be implemented in various embodiments to effectively reduce the impact of signal interferences in LIDAR sensors and systems. In one example aspect, a light detection and ranging apparatus includes a light emitter configured to generate, according to a first electrical pulse signal, a pulse light signal that is directed toward an object in an external environment. The first electrical pulse signal comprises a first set of non-uniformly spaced pulses. The apparatus includes a receiver configured to receive one or more returned light signals reflected by the object and convert the returned light signals into electrical signals and a filtering subsystem in communication with the receiver. The filtering subsystem is configured to receive the electrical signals from the receiver and remove a point from a set of points representing at least a partial surface of the object as noise by determining whether there is a coherence between the point and corresponding neighboring points of the point along at least a first direction and a second direction of the set of points.

In some embodiments, two adjacent pulses of the first set of pulses are separated by a randomized distance in time domain. In some embodiments, the light emitter is configured to generate a second pulse light signal according to a second electrical pulse signal, wherein the second electrical pulse signal comprises a second set of non-uniformly spaced pulses, and wherein at least one pulse in the second set of pulses is positioned at a different time-domain location than a corresponding pulse in the first set of pulses. In some embodiments, the light emitter is configured to generate a third pulse light signal according to a third electrical pulse signal, wherein the third electrical pulse signal comprises a third set of non-uniformly spaced pulses, and wherein no pulse in the third set of pulses shares a same time-domain location as any pulse in the first set of pulses. In some embodiments, each of the first, second, and third electrical pulse signal comprises a pulse signature. The pulse signature can be unique for each of the first, second, and third electrical pulse signal.

In some embodiments, each point carries information about a vector that indicates an estimated surface normal of the object, and wherein the first direction and the second direction are determined based on the vector. In some embodiments, the first direction and the second direction are two directions in a Cartesian coordinate system.

In some embodiments, determining the coherence between the point and the corresponding neighboring points comprises examining information carried in the neighboring points of the point and determining whether the point and the neighboring points both represent the surface of the same object. In some embodiments, the information carried in a neighboring point includes at least a location of the neighboring point or a color of the neighboring point.

In another example aspect, a method for sensing an object in an external environment using a light detection and ranging device includes emitting, by a light emitter of the light detection and range device, a pulse light signal towards the object according to an electrical pulse signal, the electrical pulse signal comprising a first set of non-uniformly spaced pulses. The method includes receiving, by a receiver of the light detection and range device, one or more returned light signals reflected by the object and converting, by the receiver, the one or more return light signals into electrical signals. The method also includes filtering a target point from a set of points representing at least a partial surface of the object as noise by determining whether there is a coherence between the target point and corresponding neighboring points of the target point along a first direction and a second direction of the model.

In some embodiments, two adjacent pulses of the first set of pulses are separated by a randomized distance in time domain. In some embodiments, the method includes emitting a second pulse light signal according to a second electrical pulse signal. The second electrical pulse signal comprises a second set of non-uniformly spaced pulses and at least one pulse in the second set of pulses is positioned at a different time-domain location than a corresponding pulse in the first set of pulses. In some embodiments, the method includes emitting a third pulse light signal according to a third electrical pulse signal. The third electrical pulse signal comprises a third set of non-uniformly spaced pulses and no pulse in the third set of pulses shares a same time-domain location as any pulse in the first set of pulse. In some embodiments, each of the first, second, and third electrical pulse signal comprises a pulse signature. The pulse signature can be unique for each of the first, second, and third electrical pulse signal.

In some embodiments, each point carries information about a vector that indicates an estimated surface normal of the object. The method includes determining two orthogonal directions as the first direction and the second direction based on the vector. In some embodiments, the method includes selecting two orthogonal directions in a Cartesian coordinate system as the first direction and the second direction.

In some embodiments, determining the coherence between the target point and the corresponding neighboring points includes examining information carried in the neighboring points of the target point and determining whether the target point and the neighboring points both represent the surface of the same object. In some embodiments, the information carried in a neighboring point includes a location of the neighboring point. In some embodiments, the method can include filtering out the target point upon determining that a distance between the neighboring point and the target point exceeds a predefined threshold. In some embodiments, the information carried in a neighboring point includes a color of the neighboring point. The method can include filtering out the target point upon determining that a color difference between the neighboring point and the target point exceeds a predefined threshold.

In some embodiments, filtering the target point comprises constructing a bounding box for the target point, determining a number of neighboring points that are coherent with the target point, and filtering out the target point upon determining that the number of coherent neighboring points is equal to or smaller than a predefined threshold.

In another example aspect, a non-transitory computer readable medium having processor code stored thereon including program code for performing a method that comprises emitting, by a light emitter of the light detection and range device, a pulse light signal towards the object according to an electrical pulse signal, the electrical pulse signal comprising a first set of non-uniformly spaced pulses. The method includes receiving, by a receiver of the light detection and range device, one or more returned light signals reflected by the object and converting, by the receiver, the one or more return light signals into electrical signals. The method also includes filtering a target point from a set of points representing at least a partial surface of the object as noise by determining whether there is a coherence between the target point and corresponding neighboring points of the target point along a first direction and a second direction of the model.

In some embodiments, two adjacent pulses of the first set of pulses are separated by a randomized distance in time domain. In some embodiments, determining the coherence between the target point and the corresponding neighboring points comprises examining information carried in the neighboring points of the target point and determining whether the target point and the neighboring points both represent the surface of the same object. In some embodiments, the information carried in a neighboring point includes at least a location of the neighboring point or a color of the neighboring point. In some embodiments, filtering the target point comprises constructing a bounding box for the target point, determining a number of neighboring points that are coherent with the target point, and filtering out the target point upon determining that the number of coherent neighboring points is equal to or smaller than a predefined threshold.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including, by way of example, a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory, or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including, by way of example, semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only where exemplary means an example. As used herein, the singular forms "a," "an," and "the" are intended to include the plural forms as well, unless the context clearly indicates otherwise. Additionally, the use of "or" is intended to include "and/or," unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document, in the context of separate embodiments, can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

We claim:

1. A light detection and ranging apparatus, comprising:
a light emitter configured to generate, according to a first electrical pulse signal, a first light signal comprising one or more pulses;
a receiver configured to receive a return light signal, wherein a controller in communication with the receiver is configured to generate one more points in a point cloud based on the return light signal, wherein the point cloud includes a set of points representing a partial surface of an object and a subsystem, configured to identify as noise a target point from the set of points representing the partial surface of the object by determining whether there is a coherence between the target point and a first neighboring point of the target point along a first direction and a coherence between the target point and a second neighboring point of the target point along a second direction, wherein the first neighboring point and the second neighboring point are from the set of points representing the partial surface of the object in the point cloud.

2. The apparatus of claim 1, wherein a dithering technique randomizes one or more firing times of the respective one or more pulses of the first light signal.

3. The apparatus of claim 2, wherein the dithering technique is combined with a pulse signature of the first light signal to reduce a likelihood of signal interference.

4. The apparatus of claim 1, wherein the controller is further configured to facilitate the generation of the first light signal by the light emitter.

5. The apparatus of claim 4, wherein the controller has one or more processors and memory.

6. The apparatus of claim 1, further comprising a network adapter configured to facilitate communication over a network.

7. The apparatus of claim 6, wherein the network adapter is further configured to communicate with at least one remote device to process and store data remotely.

8. The apparatus of claim 1, wherein the subsystem is further configured to estimate a confidence of validity of a determination that the target point is noise.

9. The apparatus of claim 1, wherein the subsystem is further configured to remove the target point identified as noise from the set of points.

10. The apparatus of claim 1, wherein the first electrical pulse signal has a first set of non-uniformly spaced pulses.

11. The apparatus of claim 10, wherein the one or more pulses of the first light signal have a pulse signature including the first set of non-uniformly spaced pulses.

12. A method for light detection and ranging, comprising:
emitting, by a light emitter, a first light signal according to an electrical pulse signal, the first light signal comprising one or more pulses;
receiving, by a receiver, one or more return light signals reflected by an object;
converting, by the receiver, the one or more return light signals into electrical signals, wherein said electrical signals are used to generate one or more points in a point cloud, wherein the point cloud includes a set of points representing a partial surface of the object; and
identifying as noise a target point from the set of points representing the partial surface of the object by determining whether there is a coherence between the target point and a first neighboring point of the target point along a first direction and a coherence between the target point and a second neighboring point of the target point along a second direction, wherein the first neighboring point and the second neighboring point are from the set of points representing the partial surface of the object in the point cloud.

13. The method of claim 12, further comprising performing a dithering technique to randomize one or more firing times of the respective one or more pulses of the first light signal.

14. The method of claim 13, further comprising combining the dithering technique with a pulse signature of the first light signal to reduce a likelihood of signal interference with other light signals.

15. The method of claim 12, further comprising facilitating, by a network adapter, communication over a network.

16. The method of claim 15, further comprising communicating, by the network adapter, with at least one remote device to process and store data remotely.

17. The method of claim 12, further comprising estimating a confidence of validity of a determination that the target point is noise.

18. The method of claim 12, further comprising removing the target point from the set of points.

19. The method of claim 12, wherein the electrical pulse signal has a first set of non-uniformly spaced pulses.

20. The method of claim 19, wherein the one or more pulses of the first light signal have a pulse signature including the first set of non-uniformly spaced pulses.

21. A non-transitory computer readable medium having processor code stored thereon including program code for performing operations comprising:
emitting, by a light emitter, a first light signal according to an electrical pulse signal, the first light signal comprising one or more pulses;
receiving, by a receiver, one or more return light signals reflected by an object;
converting, by the receiver, the one or more return light signals into electrical signals, wherein said electrical signals are used to generate one or more points in a point cloud, wherein the point cloud includes a set of points representing a partial surface of the object; and
identifying as noise a target point from the set of points representing the partial surface of the object by determining whether there is a coherence between the target point and a first neighboring point of the target point along a first direction and a coherence between the target point and a second neighboring point of the target point along a second direction, wherein the first neighboring point and the second neighboring point are from the set of points included in the point cloud.

22. The non-transitory computer readable medium of claim 21, wherein the operations further comprise performing a dithering technique to randomize one or more firing times of the respective one or more pulses of the first light signal.

23. The non-transitory computer readable medium of claim 22, wherein the operations further comprise combining the dithering technique is with a pulse signature of the first light signal to reduce a likelihood of signal interference with other light signals.

24. The non-transitory computer readable medium of claim 21, wherein the operations further comprise estimating a confidence of validity of a determination that the target point is noise.

25. The non-transitory computer readable medium of claim 21, wherein the operations further comprise removing the target point from the set of points.

26. The non-transitory computer readable medium of claim 21, wherein the electrical pulse signal has a first set of non-uniformly spaced pulses.

27. The non-transitory computer readable medium of claim 26, wherein the one or more pulses of the first light signal have a pulse signature including the first set of non-uniformly spaced pulses.

28. The non-transitory computer readable medium of claim 26, wherein two adjacent pulses of the first set of non-uniformly spaced pulses are separated by a randomized distance in time domain.

* * * * *